(12) United States Patent
Qi et al.

(10) Patent No.: US 9,268,799 B1
(45) Date of Patent: Feb. 23, 2016

(54) SYSTEM AND METHOD FOR RESTORING DATA FROM A REMOTE REPOSITORY

(71) Applicants: Feng Qi, Beijing (CN); Pei Mao, Beijing (CN); Guohua Chen, Beijing (CN)

(72) Inventors: Feng Qi, Beijing (CN); Pei Mao, Beijing (CN); Guohua Chen, Beijing (CN)

(73) Assignee: CA, Inc., New York, NY (US)

( * ) Notice: Subject to any disclaimer, the term of this patent is extended or adjusted under 35 U.S.C. 154(b) by 267 days.

(21) Appl. No.: 13/928,843

(22) Filed: Jun. 27, 2013

(51) Int. Cl.
*G06F 17/30* (2006.01)

(52) U.S. Cl.
CPC .................. *G06F 17/30289* (2013.01)

(58) Field of Classification Search
CPC ...................... G06F 17/30289; G06F 17/30371
USPC ................................................. 707/645, 608
See application file for complete search history.

(56) References Cited

U.S. PATENT DOCUMENTS

| | | | | |
|---|---|---|---|---|
| 5,875,478 A * | 2/1999 | Blumenau | ........... | G06F 11/1458 711/162 |
| 7,725,428 B1 * | 5/2010 | Hawkins et al. | ....................... | 1/1 |
| 8,121,874 B1 * | 2/2012 | Guheen | ................ | G06Q 10/063 705/28 |
| 2010/0293147 A1 * | 11/2010 | Snow | ................ | G06F 17/30067 707/640 |
| 2011/0153571 A1 * | 6/2011 | Walker | ................ | G06F 11/1435 707/654 |
| 2012/0130956 A1 * | 5/2012 | Caputo | ............... | G06F 11/1469 707/679 |
| 2012/0203742 A1 * | 8/2012 | Goodman et al. | ............ | 707/646 |
| 2013/0054536 A1 * | 2/2013 | Sengupta et al. | ............ | 707/654 |
| 2013/0211870 A1 * | 8/2013 | Lawson | ........... | G06Q 10/06315 705/7.25 |
| 2013/0212420 A1 * | 8/2013 | Lawson | ............ | G05B 19/4185 713/400 |
| 2013/0262396 A1 * | 10/2013 | Kripalani et al. | ............. | 707/674 |
| 2014/0188808 A1 * | 7/2014 | Wolf | ................. | G06F 17/30289 707/654 |
| 2014/0189432 A1 * | 7/2014 | Gokhale et al. | ................. | 714/41 |
| 2014/0351205 A1 * | 11/2014 | Fennell et al. | ................ | 707/609 |

OTHER PUBLICATIONS

Hewlett-Packard Development Company, L.P., HP Data Protector A.06.11 Concepts Guide, 2009, pp. 93-100, 338.

* cited by examiner

*Primary Examiner* — Noosha Arjomandi
(74) *Attorney, Agent, or Firm* — Baker Botts L.L.P.

(57) ABSTRACT

A method includes receiving a request to restore a memory of a client and determining a selected full session from a plurality of full sessions, each full session comprising a respective copy of data received from the memory of the client and a respective backup time stamp. The selected full session includes a most recent full backup having a respective backup time stamp prior to a selected restore time. The method further includes copying the selected full session to a restore session and determining a selected incremental session from a plurality of incremental sessions. Each incremental session includes a respective incremental backup time stamp, and respective changes to the data received from the memory of the client. The method further includes modifying the restore session in a cloud computing environment based on the selected incremental session, and transmitting the modified restore session across a network to the client.

17 Claims, 2 Drawing Sheets

SYSTEM AND METHOD FOR RESTORING DATA FROM A REMOTE REPOSITORY

BACKGROUND

The disclosure relates generally to data storage and backup, and more specifically, to a system and method for restoring data from a remote repository.

SUMMARY

According to one embodiment, a method for restoring data is disclosed. The method includes receiving a request to restore a memory of a client. The method also includes determining a selected full session from a plurality of full sessions, each full session comprising a respective copy of data received from the memory of the client and a respective backup time stamp. The selected full session includes a most recent full backup having a respective backup time stamp prior to a selected restore time is the selected full session. The method further includes copying the selected full session to a restore session. The method still further includes determining a selected incremental session from a plurality of incremental sessions. Each incremental session includes a respective incremental backup time stamp, and respective changes to the data received from the memory of the client. The selected incremental session includes a most recent incremental backup time stamp prior to the restore time. The method even further includes modifying the restore session in a cloud computing environment based on the selected incremental session, and transmitting the modified restore session across a network to the client.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
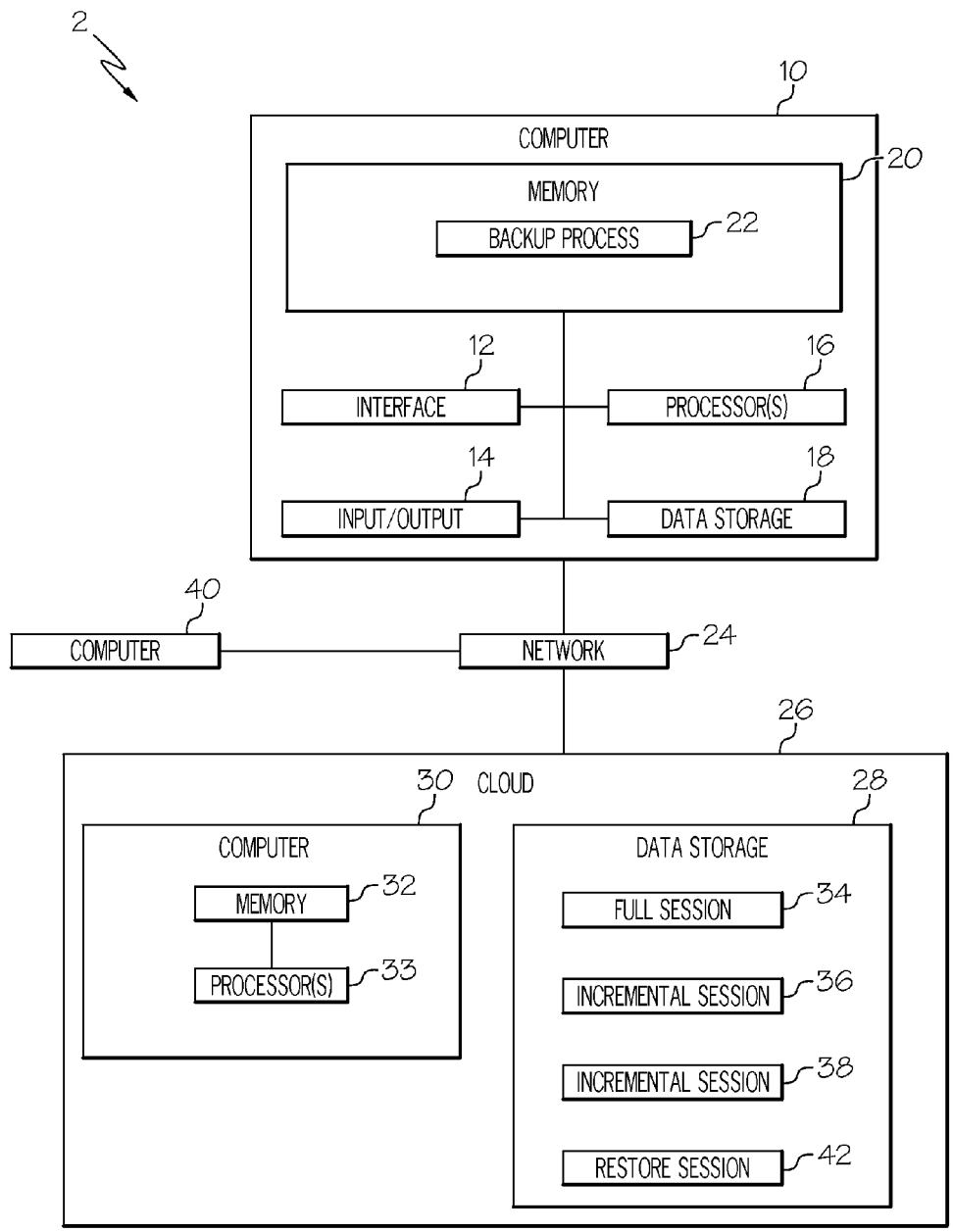
FIG. 1 illustrates a block diagram of a system for merging backup sessions in accordance with one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Businesses use cloud technology and solution spreading to simplify their enterprise IT architecture, and may choose cloud storage as their data protection and backup scheme to reduce the expense of purchasing storage devices. Several data backup and restoration solutions based on the data repository model are available. However, when client restoration is needed, such data repository solutions necessitate transferring multiple sets of repository data to the client, which may cause the business to incur transfer and usage penalties from their cloud provider. For example, the MICROSOFT® AZURE provider charges the user based on outbound data transfer usage. Furthermore, such data repository solutions further incur network delays as data is transferred across internet service providers (ISP). These delays may increase as the amount of data stored and the number of incremental backup sessions increases. Such delays increase the recovery time objective (RTO) of an organization, and encourage the business to increase the time window between backups, or their recovery point objective (RPO).

The present disclosure may enable an organization to reduce their cloud restore stages and the total amount of data transferred from the cloud data center. Thus, the teachings of the present disclosure may reduce an organization's RTO and data protection process cost, and/or may increase their RPO.

Referring to FIG. 1, a system 2 for merging backup sessions is illustrated. System 2 represents a system architecture diagram for a business organization wherein sensitive data and operations necessitate frequent data backup and maintenance. System 2 includes, among other things, computers 10, computer 40 and a cloud computing environment 26. For example, computer 10 may represent an application and database server for an e-commerce function of an enterprise. Customer information is backed up from a data storage 18 to a data storage 28 in cloud environment 26. In this example, cloud environment 26 is a public cloud environment managed by a public cloud provider. Computers 10 and 40 each include a memory 20, an interface 12, an I/O device(s) 14, a processor(s) 16 and a data storage 18. A backup process 22 creates a full session backup 34 of data storage 18 and stores it in data storage 28 using network 24. Backup process 22 in this embodiment further includes creating incremental session backups 36-38. The full sessions and backup sessions may be stored in data storage 28. When a failure event occurs and data storage 18 on computer 10 is lost or compromised, system 2 may utilize a full session 34 and backup sessions 36-38 to facilitate the restoration of data storage 18 to the last backup point. For example, a request is sent to virtual computer 30 in cloud environment 26 to restore data storage 18 to its state at a particular time. Parts of full session 34 and incremental sessions 36-38 are loaded into a memory 32 of computer 30. Processor 33 creates a copy of full session 34 in restore session 42 and merges changes from incremental sessions 36-38 into restore session 42. Full session 34 may include a copy of data storage 18 at a backup time. Incremental session 36 may include changes made to the data in data storage 18 after full session 34 was created. Incremental session 38 may include changes made to the data in data storage 18 after incremental session 36 was created. It will be appreciated by those of ordinary skill in the art that any number of additional incremental sessions may be created and stored.

To start the restoration process, a restore time may be selected that represents the state to restore data storage 18 to. For example, a user selects a restore time from a system interface or may request a site administrator to restore the machine to its state at a specific time in the past. In another example, using the above backup process 22 where incremental backups are used to create incremental sessions every hour, if the restore time is 11:01 a.m., system 2 restores data storage 18 using full session 34 and the changes from incremental session 36 created at 11:00 a.m. System 2 may utilize the restore time to select all incremental sessions 36-38 and one full session 34 necessary to restore data storage 18 to the last backup point before the restore time. System 2 may then copy full session 34 into a restore session 42, and may further apply each selected incremental session 36-38 to the restore session. For example, again using the above backup process 22 where full backups are taken every week and incremental backups are taken every hour, if the restore time is 11:01 a.m. on a Monday, system 2 copies the closest full session 34 that was created before 11:01 a.m. on Monday into restore session 42. System 2 may modify restore session 42 with each incremental session 36-38 created after full session 34 and before the restore time in order to create an image of data storage 18 as it appeared at the last backup point before the restore time. System 2 may transmit restore session 42 over network 24 to computer 10, in order to restore data storage 18 to its state at the last backup point before the restore time.

System 2 may load partial or full backup sessions into memory 32 for processing. For example, full session 34 includes 100 gigabytes of data, while memory 32 of computer 30 only includes 12 gigabytes of free space. Pages or sections of full session 34 and incremental session 36 are loaded into memory 32 such that processor 33 can copy and/or merge backup session data into restore session 42.

Computer 40 represents any compatible computer on network 24. System 2 may include re-imaging computer 40 using the restore session comprising the backups from computer 10. The re-imaging process may cause the data storage of computer 40 to contain the same data as data storage 18 had at the last backup before the restore time. Thus, the re-imaging process is similar to the restoration process.

A backup strategy that system 2 is embodied in may start with a data repository (e.g., data storage 28) that has a specific definition and organization. For example, a repository comprises a list of backup tapes and the dates they may have been written. In another example, a repository comprises a sophisticated setup with an index, catalog, or relational database. These and other repository models have different advantages depending on the backup strategy desired. This may be closely related to choosing a backup rotation scheme.

An incremental style repository facilitates storing backups from many points in time by organizing the data into increments of change between points in time. This type of repository may eliminate the need to store duplicate copies of unchanged data. For example, a full backup of all files on a system may be made. Then incremental or differential backups may be made that capture the changes made to the files since the full backup was made. Restoring a whole system to a certain point in time may require locating the last full backup taken previous to that time and locating all incremental or differential backups that may cover the period of time between the full backup and the point in time to which the system may be restored to. In certain embodiments, system 2 may reorganize the repository and may synthesize full backups from a series of incremental backup sessions.

One or more of the following failure events may necessitate a recovery and restoration of data: data center loss of power, computing center loss of power, disk failure, or natural disaster. When such an event occurs, client data may be destroyed, but can be recovered from a backup provider (e.g., a cloud provider). Public cloud venders, however, often meter client requests to the cloud, and charge based on how much data may be transferred from the cloud to the client. Incremental style repositories with multiple stages and a high RPO may increase the restore time and cost on such public cloud providers.

As those of ordinary skill in the art will appreciate, embodiments of the present disclosure are applicable to both public and private cloud environments. One example embodiment of a public cloud provider is a service provider that provides resources, such as applications, services, and storage, available to the general public via a network or the internet. Such services may be provided on a pay as you go, or free basis. Example providers include MICROSOFT® and GOOGLE®. For example, these providers own infrastructure and computing resources located at data centers, and expose their resources for consumption via the internet.

One example embodiment of a private cloud includes a virtual private cloud where provisioned resources are reserved for a specific customer within a public cloud environment. For example, AMAZON Web Services hosts AMAZON Virtual Private Cloud, that allows AMAZON Elastic Compute Cloud ("ECC") services to be connected to legacy infrastructure via a virtual private network ("VPN"). Another example of a private cloud includes an organization provisioning resources (e.g., physical servers) to support a private virtualization environment.

Cloud providers may include a commercial cloud platform (e.g., cloud 26) that provide a variety of cloud services to business and consumers. Such cloud providers include a vast server infrastructure that may be capable of providing many computing units, processors, storage and platforms. Service may be scaled up or down, depending on the needs of the customer. For example, an individual user may purchase cloud computing backup services from AMAZON.COM®. The user may pay a small monthly fee and may pay utilization rates based on usage during the billing period. Such utilization rates may allow AMAZON.COM to dynamically allocate processor and bandwidth capacity between user accounts depending on their utilization.

Such cloud environments further allow business users to pay for what they use, which may present an advantage to procuring private servers or private cloud solutions. For example, to enable a backup solution a business purchases storage space from a provider. The storage space is calculated based on the current need of the business. Storage space may be added instantaneously through a user interface. Such a dynamic configuration presents an advantage over a private cloud configuration because adding resources requires purchase, procurement, and setup time. Further, excess storage space is wasted while not in use. The cost of powering unused disk drives and other costs leads many businesses to select a public cloud environment for their backup and storage needs.

In order to protect data servers, backups are frequently created in order to preserve data integrity in case of a failure event. In a busy data server, data is updated frequently, and data that was updated after the last backup will be lost. Thus, in business continuity planning, businesses account for RPO as the maximum tolerable period in which data might be lost from an IT service due to a failure event. The data loss period may be controlled by increasing or decreasing an interval time window. For example to minimize data loss and therefore maximize RPO, the interval time window may be decreased. Thus, frequent full backup sessions 34 would be created. But creating many full backup sessions 34 may require more storage in order to store the backup data. For example, if 10 GB of data needs to be backed up every two hours, system 2 will require 120 GB for each day, which is twice the storage space required for a backup process where data is backed up every 4 hours.

In order to reduce the backup disk space and network transfer time (e.g., RTO) required to implement backup process 22 in system 2, an incremental backup process may be implemented. An incremental backup process only backs up the data changed since the last backup, thereby significantly reducing the size of subsequent backup sessions. For example, an incremental backup session 36 contains changes from data storage 18 that occurred since the last full backup session 34, or, alternatively, if a previous incremental session 36 was created after the last full backup session 34, the incremental backup session 38 would contain changes from data storage 18 that occurred since the last incremental backup session 36. Thus, the process minimizes the amount of duplicate data that needs to be stored in system 2. In a particular embodiment, when a failure event occurs, the most recently created full session is restored first, and that full session is modified by all incremental backup sessions that follow.

A differential backup process is yet another process for backing up data. The differential backup process includes all changes made since the last full backup, even if previous differential backup sessions were created. This process duplicates on the changed data since the last full backup session among the relevant differential sessions, but enables creating a backup image with only two sessions—the full session and a differential session. The disclosure may embody a differential backup process, incremental backup process, or any other backup process that may reduce the amount of data storage required.

In certain embodiments, computer 30 and computer 10 are connected by an intranet, which may have a very high network speed. However, when computer 30 is located in a cloud 26 computing environment, the cloud datacenter is often in a different geographic location that may not be inside the intranet and may have varying network speeds due to one or more of traffic or bandwidth. Further, every new connection to cloud 26 and every byte of data may be metered by the cloud provider who may charge the user per byte of data transferred or accessed. The embodiments in the disclosure describe merging the full session 34 and incremental session(s) 36-38 into a restore session 42 in the cloud 26 environment and then transmitting the restore session 42 to the target computer 10, in order to reduce the recovery time (i.e., RTO) and cost of restoring computer 10.

Figure 2:
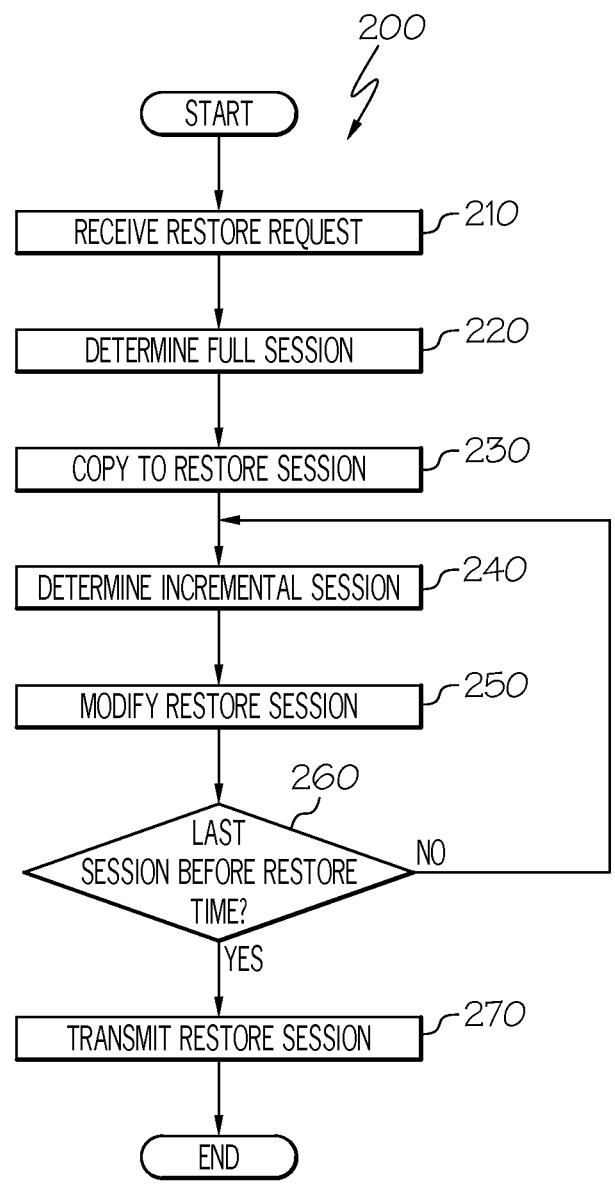
FIG. 2 illustrates a flowchart of a method for merging backup sessions in accordance with an embodiment.

Referring to FIG. 2, a method 200 for merging backups may be executed by computer 30. At step 210, a client makes a request for a backup session. For example, computer 40 makes a request for a backup session and includes a restore time in the request. The restore time indicates the time state of the backup expected to be received in response to the request. For example, a user wishes to create a virtual machine on computer 40 based on the state of data storage 18 at a specified point in time. The user specifies the point in time at which to generate the backup session. This point in time is sent to computer 30 in the request for a backup session as the restore time, and computer 30 generates a backup session roughly matching the state of data storage 18 at the restore time.

At step 220, a full session 34 is determined. The full session 34 may be selected based on a restore time and may be loaded into memory 32 of computer 30 using processor 33. Computer 30 may include an interface, input/output and data storage. In certain embodiments, cloud environment 26 includes data storage 28 that contains all the full and incremental backup sessions. Data storage 28 and/or memory 32 may include a plurality of full sessions 34 created at a regular interval (e.g., weekly or monthly). For example, method 200 may select a full session 34 with a creation time before the restore time. Each full session 34 may include a creation date that represents the time the full session (e.g., full backup) was generated. Full session 34 may also include all data from data storage 18 in computer 10.

In certain embodiments, computer 40 requests a backup of a second memory. For example, computer 40 requests a backup of data storage 18 on computer 10. In these types of embodiments, full session 34 includes a copy of second data received from a second memory of a second client. Relevant incremental sessions 36-38 include second changes to the second data received from the second memory of the second client.

At step 230, computer 30 may copy full session 34 into a restore session 42 in memory 32. Restore session 42 may be created as a blank disk image in memory 32 of computer 30, and stored in data storage 28. Full session 34 may be copied in order to preserve full session 34 in data storage 28 such that future restoration or re-imaging requests may be accommodated. Method 200 may be used to restore computer 10 data storage 18 to a previous state, and may be used to create an image of computer 10 to copy to computer 40 using restore session 42. Both such cases benefit from the decreased data transferred when transferring restore session 42.

At step 240, computer 30 may determine relevant incremental sessions 36-38 in data storage 28 based on the restore time and may load incremental sessions 36-38 into memory 32. In a particular embodiment, computer 30 has a data storage that contains a plurality of incremental sessions 36-38. Computer 30 searches a time stamp on each incremental session 36-38, wherein the time stamp indicates the date and time which that session was created. Based on a restore time, and the time of the selected full session 34, computer 30 selects the appropriate incremental sessions and loads them into memory 32. For example, the appropriate incremental sessions may be determined by selecting all incremental sessions 36-38 with a time stamp after the backup time of full session 34, and with a time stamp before the restore time. Selecting such incremental sessions will ensure restore session 42 is created such that it facilitates restoring a computer hard drive to the state of data storage 18 at the last backup point before the restore time.

At step 250, computer 30 may modify restore session 42 such that restore session 42 includes the changes from each incremental session 36-38. For example, incremental session 36 may have a time stamp of 1:00 a.m. and may contain instructions to delete files in a data structure while incremental session 38 may have a time stamp of 2:00 a.m. and may contain different instructions to create new files in a data structure. In this embodiment, neither incremental sessions 36-38 contain the actual data structure which they purport to modify. Such incremental sessions do, however, contain references to data structures embodied in full session 34.

In another embodiment, method 200 may be part of a differential backup process, wherein each incremental session 36-38 still contains references to data structure in full session 34, but each incremental session contains cumulative changes since the full session backup time. For example, incremental session 36 may have a time stamp of 1:00 a.m. and may contain instructions to delete files in a data structure. Incremental session 38 may have a time stamp of 2:00 a.m., may contain the instructions to delete files in a data structure from session 36, and may further contain instructions to create new files in a data structure.

Computer 30 may parse such information from incremental sessions 36-38 at step 250 and may modify restore session 42 accordingly. Because step 240 is performed in the cloud or on the backup server, network transfer time and data transfer utilization charges may be saved, and a more robust backup process can be implemented without fear of incurring additional charges or increasing RTO.

In still another embodiment, at step 240, a set of incremental sessions is determined. The set is determined based on the backup time of the last full session before the restore time and all the incremental sessions in between the full session backup time and the restore time. For example, consider a backup system wherein incremental backups are taken every hour, and a full backup is taken every Monday night at 1 a.m. A user modifies computer 40 in a way that causes computer 40 to malfunction, and wants to restore (e.g., roll-back) their system to how it was operating on Monday at 4 p.m. The user makes a request to generate a backup session to computer 30. Computer 30 determines the full backup session closest in time to Monday at 4 p.m. In this example, the full backup session has a backup time of Monday at 1 a.m. The full backup session is copied into the restore session at step 230. At step 240, a set of incremental sessions is determined. The incremental backup sessions were taken every hour, and the sessions selected here are those taken between Monday at 1 a.m. and Monday at 4 p.m. The restore session is iteratively modified starting with the incremental session taken Monday at 2 a.m.

In the above example, a test is performed at step 260 in the iterative loop to determine if any more incremental sessions remain in the set of incremental sessions. If incremental sessions remain in the set, method 200 loops back to step 240 to determine which incremental session to apply to the restore session next. In accordance with the above example, the incremental session taken Monday at 3 a.m. is applied to the restore session after the incremental session taken on Monday at 2 a.m. This process is carried through until the session taken on Monday at 4 p.m. is applied to the restore session. After this point, no more restore sessions are available to apply, and the modified restore session is thus transmitted to the requesting client in accordance with step 270.

At step 270, computer 30 may transmit restore session 42 over network 24. Cloud 26 may reside in a public cloud environment that may be physically located remotely from computers 10 and 40. For example, cloud 26 may be physically located in New York and computer 10 may be located in California. Data transmitted in method 200 may cross several internet backbone providers and internet service provider networks. For transmitting large amounts of data, as is required in a backup process, such a network may present bottlenecks to data flow. Thus, selecting a backup process that facilitates transmitting the least amount of data is crucial to reducing RTO and increasing RPO. In a different embodiment, computer 30 may be located on a corporate intranet along with computer 10 and computer 40.

Method 200 enables businesses to save on expenses. Commercial cloud environment providers often charge based on bandwidth usage. Using method 200 reduces unnecessary data transfer and therefore saves expenses. For example, method 200 reduces the number of incremental sessions transferred from the cloud to the client during a restore or re-image process.

Method 200 also reduces time in data transfer, and requires less restore steps, therefore reducing recovery time, or RTO. For example, system backups often reach many gigabytes of memory capacity. high traffic networks throttle down bandwidth speeds and increase data transfer times, especially for large file transfers. Method 200 reduces the size of system restoration files that are required to be transferred because all incremental sessions are merged in the cloud, thereby reducing the overall size of data that needs to be transferred. Furthermore, because the incremental sessions are merged in the cloud, where dedicated processors can quickly perform tasks, the merge process is not required on the limited system resources at the client. Such usage of optimal resources to merge incremental sessions even further reduces system restoration times.

Cloud characteristics and network performance must be considered before implementing a backup process. Retrieving all backup copies will cost more time and more money. For example, MICROSOFT® AZURE charges based on all outbound data sent. Implementing method 200 merges all procedures of full, incremental, and differential copies to one. When local data loss occurs, customers can receive one full backup copy, that may enable them to restore their system more quickly than receiving one full backup session with several incremental backup sessions. Thus, customers receiving the backups do not have to merge the backups on their own, and can restore their system faster.

In accordance with another embodiment, system 2 for merging backup sessions may include the following steps:
1. Recognize full backed up data structure
2. Recognize incremental backed up data structure
3. Overwrite correspondent data in full backup session with data from the incremental backup session
4. Repeat steps 1, 2, and 3 for every backup incremental session until no incremental sessions remain In accordance with another embodiment, only full backup sessions may remain in the cloud environment after the backup sessions are merged. If a further restoration is required, a backup session could be selected to restore to.

System 2 for merging backup sessions may save the expense of public cloud environment providers who may charge based on bandwidth usage. System 2 will eliminate unnecessary data transfer between backup computer 30 and target computer 10, and therefore may save expense. System 2 may further reduce an organization's RTO by enabling the transmit step of the restore process to be completed by transmitting one restore session. Using the method may take less time in data transfer and may need less restore steps, which may further reduce recovery time. The method is a safe, stable and generic process, and may be implemented in other products. For example, method 200 may be implemented in CA ARCServe® Backup and CA ARCServe® D2D.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:
1. A method for restoring data, comprising:
 receiving a request to restore a memory of a client;
 determining a selected full session from a plurality of full sessions, each full session comprising a respective copy of data received from the memory of the client and a respective backup time stamp;
 wherein the selected full session comprises a most recent full backup having a respective backup time stamp prior to a selected restore time;
 copying the selected full session to a restore session;
 determining a selected incremental session from a plurality of incremental sessions, each incremental session comprising:
  a respective incremental backup time stamp;
  respective changes to the data received from the memory of the client; and
  a plurality of integrated incremental sessions, the integrated incremental sessions comprising additional changes to the data received from the memory of the client, the additional changes occurring after the respective time stamp associated with the most recent full backup, and before the most recent incremental backup time stamp;

wherein the selected incremental session comprises a most recent incremental backup time stamp prior to the restore time;

modifying the restore session in a cloud computing environment based on the selected incremental session; and transmitting the modified restore session across a network to the client.

2. The method of claim 1, wherein the plurality of the integrated incremental sessions each comprise a respective integrated incremental time stamp and respective incremental changes to the data received from the memory of the client, wherein the respective incremental changes to the data occurred before the respective integrated incremental time stamp and after the latter of: a most recent integrated incremental time stamp before the respective integrated incremental time stamp; and the respective time stamp associated with the most recent full backup.

3. The method of claim 2, wherein modifying the restore session comprises iteratively applying the respective incremental changes from each of the integrated incremental sessions to the restore session in chronological order.

4. The method of claim 1, wherein the changes to the data received from the memory of the client in the selected incremental session occur after the most recent full backup time stamp and before the most recent incremental backup time stamp.

5. The method of claim 1, wherein the full session further comprises a copy of second data received from a second memory of a second client, and the incremental session comprises second changes to the second data received from the second memory of the second client.

6. The method of claim 1, wherein the cloud computing environment is a public cloud computing environment.

7. A computer configured to access a storage device, the computer comprising:
a processor; and
a non-transitory, computer-readable storage medium storing computer-readable instructions that when executed by the processor cause the computer to perform:
receiving a request to restore a memory of a client;
determining a selected full session from a plurality of full sessions, each full session comprising a respective copy of data received from the memory of the client and a respective backup time stamp;
wherein the selected full session comprises a most recent full backup having a respective backup time stamp prior to a selected restore time;
copying the selected full session to a restore session;
determining a selected incremental session from a plurality of incremental sessions, each incremental session comprising:
a respective incremental backup time stamp;
respective changes to the data received from the memory of the client; and
a plurality of integrated incremental sessions, the integrated incremental sessions comprising additional changes to the data received from the memory of the client, the additional changes occurring after the respective time stamp associated with the most recent full backup, and before the most recent incremental backup time stamp;
wherein the selected incremental session comprises a most recent incremental backup time stamp prior to the restore time;

modifying the restore session in a cloud computing environment based on the selected incremental session; and transmitting the modified restore session across a network to the client.

8. The computer of claim 7, wherein the plurality of the integrated incremental sessions each comprise a respective integrated incremental time stamp and respective incremental changes to the data received from the memory of the client, wherein the respective incremental changes to the data occurred before the respective integrated incremental time stamp and after the latter of: a most recent integrated incremental time stamp before the respective integrated incremental time stamp; and the respective time stamp associated with the most recent full backup.

9. The computer of claim 8, wherein modifying the restore session comprises iteratively applying the respective incremental changes from each of the integrated incremental sessions to the restore session in chronological order.

10. The computer of claim 7, wherein the changes to the data received from the memory of the client in the selected incremental session occur after the most recent full backup time stamp and before the most recent incremental backup time stamp.

11. The computer of claim 7, wherein the full session further comprises a copy of second data received from a second memory of a second client, and the incremental session comprises second changes to the second data received from the second memory of the second client.

12. The computer of claim 7, wherein the cloud computing environment is a public cloud computing environment.

13. A computer program product comprising:
a non-transitory computer-readable storage medium having computer-readable program code embodied therewith, the computer-readable program code comprising:
computer-readable program code configured to receive a request to restore a memory of a client;
computer-readable program code configured to determine a selected full session from a plurality of full sessions, each full session comprising a respective copy of data received from the memory of the client and a respective backup time stamp;
wherein the selected full session comprises a most recent full backup having a respective backup time stamp prior to a selected restore time;
computer-readable program code configured to copy the selected full session to a restore session;
computer-readable program code configured to determine a selected incremental session from a plurality of incremental sessions, each incremental session comprising:
a respective incremental backup time stamp;
respective changes to the data received from the memory of the client; and
a plurality of integrated incremental sessions, the integrated incremental sessions comprising additional changes to the data received from the memory of the client, the additional changes occurring after the respective time stamp associated with the most recent full backup, and before the most recent incremental backup time stamp;
wherein the selected incremental session comprises a most recent incremental backup time stamp prior to the restore time;
computer-readable program code configured to modify the restore session in a cloud computing environment based on the selected incremental session; and computer-readable program code configured to transmit the modified restore session across a network to the client.

14. The computer program product of claim 13, wherein the plurality of the integrated incremental sessions each comprise a respective integrated incremental time stamp and respective incremental changes to the data received from the memory of the client, wherein the respective incremental changes to the data occurred before the respective integrated incremental time stamp and after the latter of: a most recent integrated incremental time stamp before the respective integrated incremental time stamp; and the respective time stamp associated with the most recent full backup.

15. The computer program product of claim 14, wherein modifying the restore session comprises iteratively applying the respective incremental changes from each of the integrated incremental sessions to the restore session in chronological order.

16. The computer program product of claim 13, wherein the changes to the data received from the memory of the client in the selected incremental session occur after the most recent full backup time stamp and before the most recent incremental backup time stamp.

17. The computer program product of claim 13, wherein the full session further comprises a copy of second data received from a second memory of a second client, and the incremental session comprises second changes to the second data received from the second memory of the second client.

* * * * *